Sept. 19, 1939.  C. ADLER, JR  2,173,747
PATROL SYSTEM
Filed Feb. 14, 1939  3 Sheets-Sheet 1
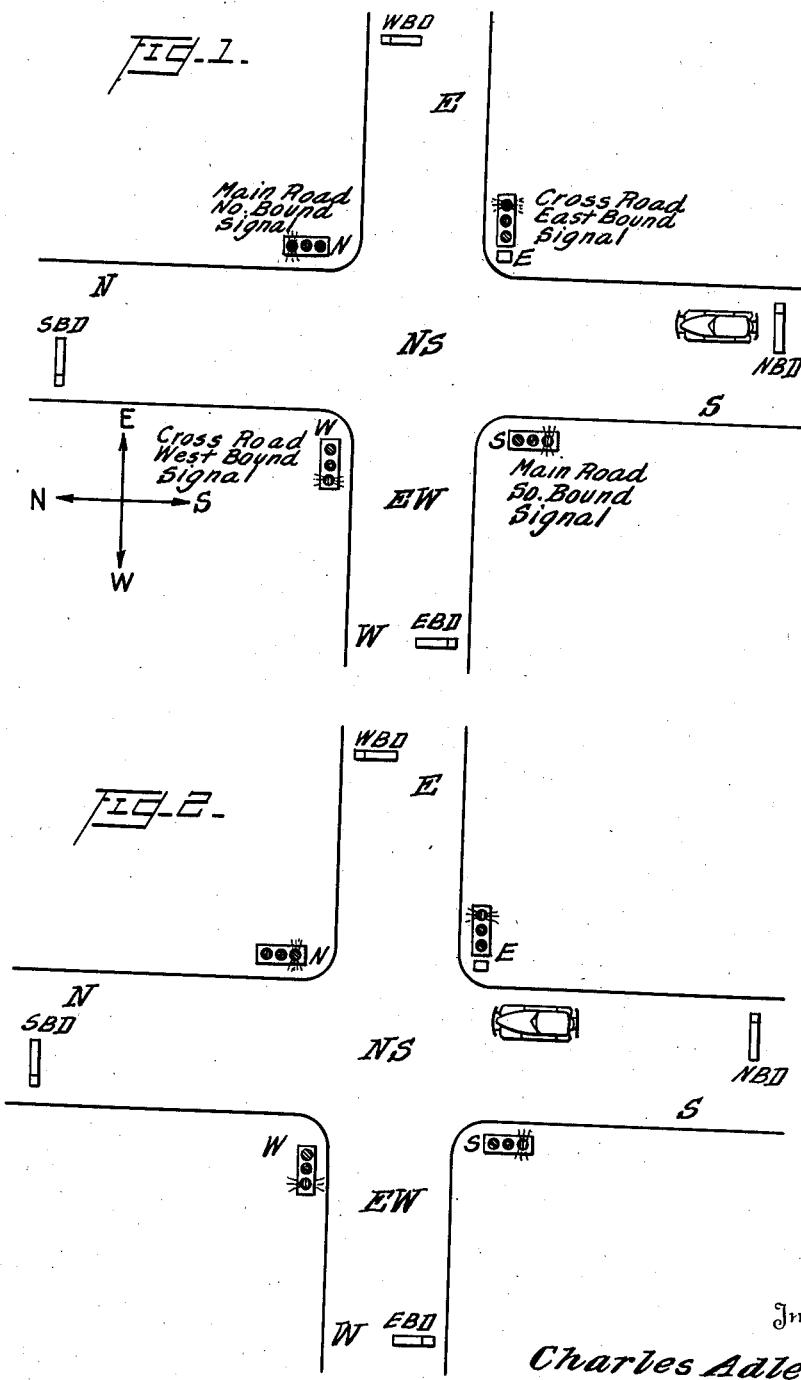

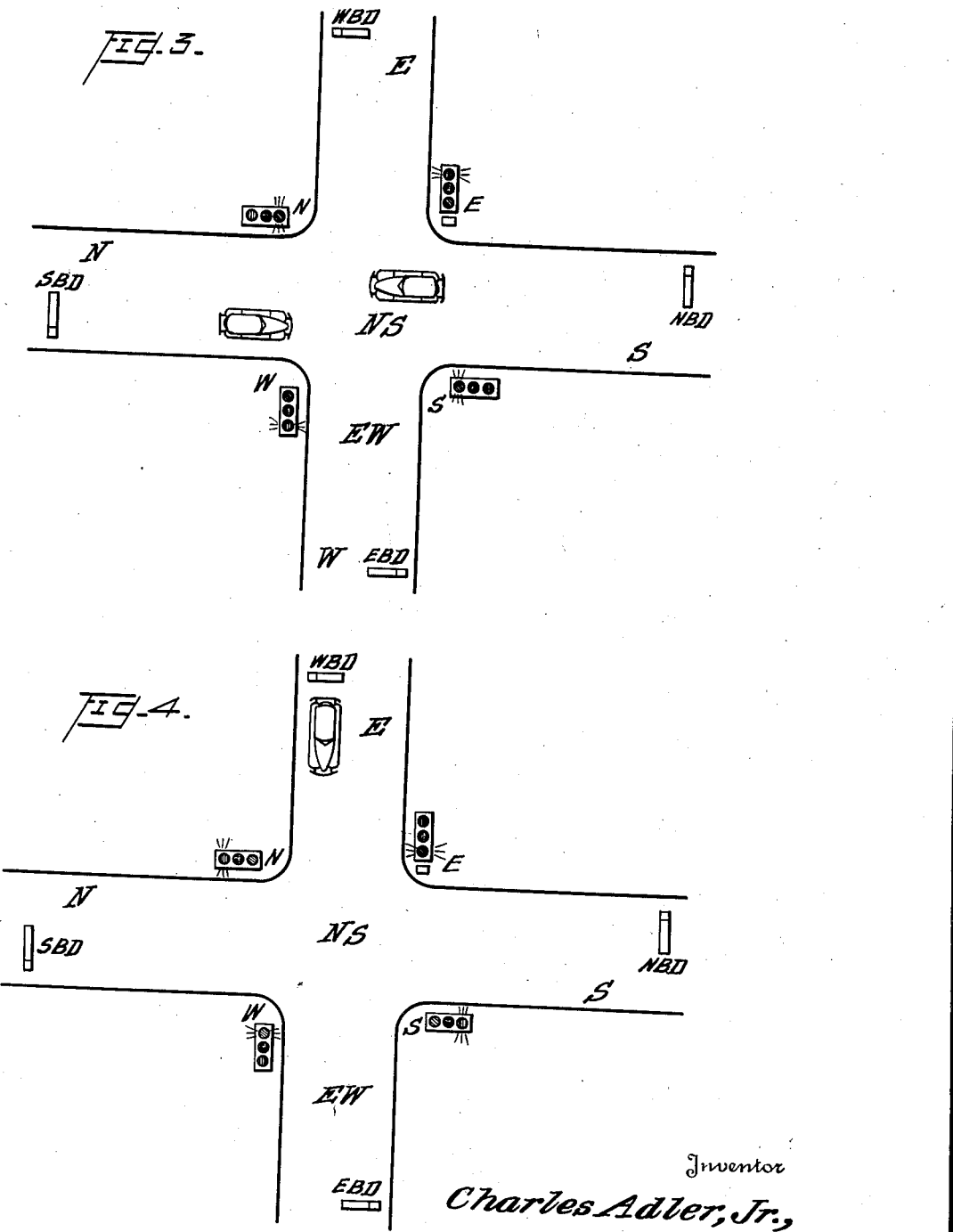

Sept. 19, 1939.   C. ADLER, JR   2,173,747
PATROL SYSTEM
Filed Feb. 14, 1939   3 Sheets-Sheet 3
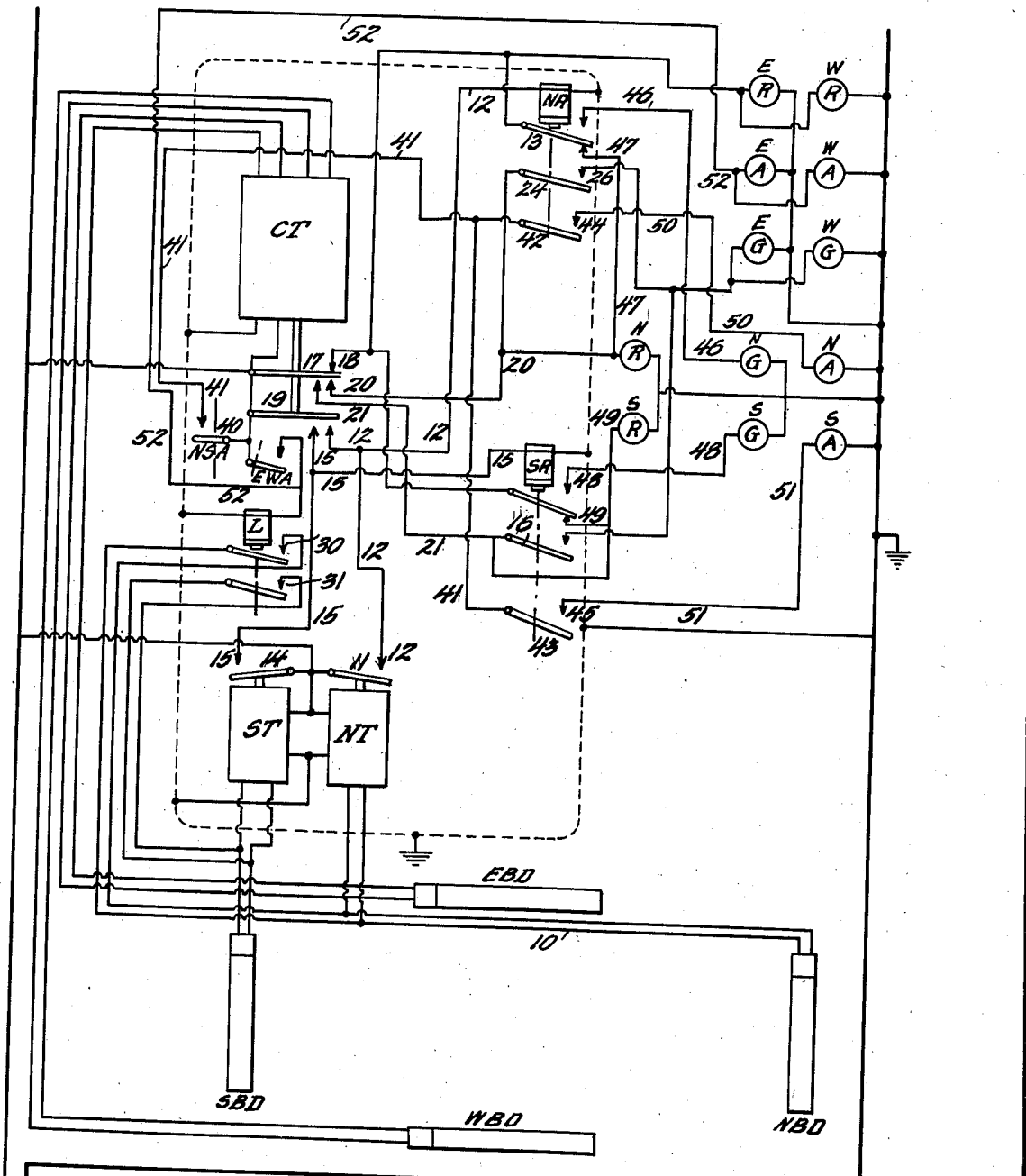
Alternating Current   FIG. 5.
Inventor
Charles Adler, Jr.,
By Cushman Darby & Cushman
Attorneys Patented Sept. 19, 1939

2,173,747

UNITED STATES PATENT OFFICE 2,173,747

PATROL SYSTEM

Charles Adler, Jr., Baltimore, Md.

Application February 14, 1939, Serial No. 256,370

12 Claims. (Cl. 177—337)

This invention relates to patrol systems for intersecting highways and aims to provide a positive means of eliminating well recognized hazards in a simple and safe manner.

Intersections on state highways where traffic moves normally at high speed are frequently located in the center of, or adjacent to, small towns. Likewise, some intersections are located near dangerous curves. Vehicle actuated signals are in operation at many of such intersections to direct the right of way at the crossing.

These traffic signals display the "proceed" indication to one road, usually the most travelled road, while showing the "stop" aspect to the other road indefinitely until a vehicle actuates the detector on such other road. In some cases, the signal normally indicates the "stop" aspect simultaneously to both intersecting roads and presents the "proceed" indication to both parallel lanes of the same road when a detector in that road is actuated by a vehicle.

In either instance, the "green" or "proceed" indication is in many cases visible for considerable distances, and experience has shown that motorists approaching the intersection from either direction, particularly on the most travelled road or main road, upon viewing the green light, fail to reduce the speed of their cars and, in fact, frequently increase their speed in an attempt to reach and pass the signal before its indication changes to "stop" or "red".

Thus, motorists who are normally approaching the town at high speed do not slow down and many drivers by actually increasing the speed of their cars are a source of constant danger to the residents of the town, including school children, pedestrians, and other cars, whereby numerous accidents have resulted.

Moreover, this temptation and tendency of motorists, viewing the green light from a considerable distance, to maintain a high speed or increase their speed, frequently causes accidents, due to the fact that the signal changes from "proceed" to "red", and the motorist is unable to apply the brakes in time to bring his car to a stop without overrunning the intersection, whence a collision with a car moving on the intersecting road takes place. This condition, well recognized, is frequently due to the displaying of the green aspect indefinitely.

Also, drivers desiring to make a left turn into the crossroad on the green aspect are sometimes struck by cars approaching on the same road from the opposite direction because, tempted by the green light or "proceed" indication, the driver of the car from the opposite direction is going faster than the driver of the first car (making the turn) realizes, and he cannot stop in time.

Merely the provision of a signal having the "red" or "stop" indication as normal for both intersecting highways does not remedy the hazardous conditions, and I have found that positive control means are necessary to render an intersection safe and prevent the numerous accidents which experience shows occurs. A minimum delay period must at all times take place between the actuation of the detector and the signal change from "red" to "green", this delay having relationship with the maximum safe driving speed for vehicles approaching the particular intersection, and the distance of the detector from the signal at the crossing in order to make the system foolproof against motorists who try to play the system. Experience has shown that some motorists, if they are aware, although the signal is red, that upon actuation of the detector, the signal will change instantly to green, will make no effort to slow down. By at all times providing a definite minimum delay between actuation of the detector and the signal change from "red" to "green", this delay having definite relationship to safe vehicle speed, and detector location, the system becomes foolproof and it is impossible to reach the crossing and obtain a green signal without either slowing down to the prescribed safe limit, or if going too fast, of stopping.

Some systems have been devised to provide a delay from "red" to "green" upon actuation of the detector, but this delay is dependent upon vehicle movement on the intersecting road or upon the warning period given traffic on the intersecting road just prior to transfer of right of way. In normal red installations, it may vary from zero (when there is no traffic on the intersecting road) to a delay of many seconds (when maximum time is on the intersecting road). But there is no minimum delay whose sole object is speed reduction to not more than a predetermined rate.

My invention comprises a patrol system having detectors or vehicle actuated means arranged in both highways and with the signals for the highways normally showing "stop". The detectors in one highway, e. g., the main highway, include means whereby a vehicle travelling in a lane of that highway in one direction will obtain the "proceed" indication independently of the signal presented to traffic approaching the intersection in the other parallel lane of the main highway. Moreover, and as an additional safeguard, such means include a speed control whereby a vehicle actuating the detector in the main highway must reduce its speed to not greater than a prescribed rate. That is, the granting of the "proceed" indication after actuation of the detector is timed to so control the speed of travel of the motorist that he may continue if travelling at a safe speed, but will be confronted by the "stop" indication and be compelled to stop if he travels too fast.

In other words, the signals for the main highway are each independently operable and each include a speed control which demand that a driver control his speed as he approaches the intersection or he will be obliged to stop. The timing is such that a vehicle travelling at a safe rate of speed will receive the "go" indication without having to stop, and the "go" indication will stay on for sufficient time to allow a car to negotiate the intersection after which the signal will change to the normal "red" or "stop". This change is directly from "green" to "red" unless the normal operation of the speed control is about to be interrupted by transfer of right of way to the intersecting highway due, for example, to actuation of a detector in this latter road. When this occurs, an "amber" indication is displayed with (or directly after) the "green" indication to give ample warning to cars on the main road that transfer of right of way is about to take place. When the signals on the main road are "red", and the "go" indication is to be given to the cross-road, no "amber" indication will appear on the main road. In the case where the indication for a single lane shows "green", the indication to the opposite parallel lane remains at "stop" unless actuated by the detector for that lane. This is in contra-distinction to those systems where the signals for both lanes are necessarily simultaneously caused to indicate "go" because they are permanently electrically connected in parallel, i. e., actuation of a single detector in the lane of the main road simultaneously causes the signals for each lane in the main road to show "green". This is unsafe because it gives traffic in the lane of the main road where a detector has not yet been actuated the temptation and opportunity to speed up by the display of the "go" signal. This contributes to the disastrous results above described, and, as will be appreciated, is due to the "green" signal for the opposite parallel lane being in effect falsely presented or given ahead of time. Such unnecessary and hazardous signal operation is positively eliminated by this invention.

Where there is a succession of cars and no travel on the opposite road of the intersection, each car will continue the "green" indication, provided it actuates the detector while the "green" indication is on. It will be appreciated that where the cars are in close succession, they will all travel within the prescribed rate of speed by reason of the first car in the line moving at this rate, and where the cars are spaced apart a distance greater than the distance from the detector to the intersection or signal, a succeeding car will be governed by the normal operation of the speed control. In this connection, it is to be understood that while the signals and the speed control means for the main highway are each independently operable for each parallel lane of the main highway, they may be simultaneously operated by traffic moving in the opposite parallel lanes actuating the detectors therein, and will independently revert to the "stop" or "red" indication.

Where the combination of independently actuated signals and speed control is located on the main highway, in association with a detector system in the intersecting highway, actuation of the detectors in the intersecting highway will transfer right of way from the main highway a predetermined minimum time after such actuation. During this time period, a "caution" signal will be displayed by the signal or signals in the main highway if the latter are indicating "proceed" or "green" in either or both directions when a detector on the cross-road is actuated. This will advise a motorist on the main highway of the impending change, and the "caution" is presented for a time period before the signal turns to "stop" such as will permit those cars close to the intersection to negotiate it, and those which are farther away from the intersection to stop without overriding the intersecting highway.

Where as in some cases, a motorist becomes trapped between the detector on the main highway and the intersection, the patrol system includes means for recalling this condition and giving the "go" indication when, after a predetermined time, the signal on the intersecting highway returns to normal red.

In one form as above described, the invention includes a system in which the independent speed control is located in the main or most heavily travelled road and detector means for transferring right of way are located in the intersecting road. With such a system, the length of time the "go" indication is presented to the intersecting highway in response to operation of a detector therein, is regulated by a timing means for causing the signals for each lane of the intersecting highway to remain at "proceed" for at least a predetermined minimum time period before they change back to "stop". The timing and the return of the signal to "stop" is independent of the actuation of either of the detectors in the main or most travelled highway.

In another form of the invention, the detectors for the speed control exert a dual function in that they also act to transfer right of way in the system just above described.

In a further form, both the main and intersecting highways are provided with independent speed control signals and in this construction, all of the speed control detectors likewise exert a dual function to transfer right of way. Suitable timing means are provided, whereby the length of time that a signal remains indicating "proceed" in response to detector actuation in either highway is regulated to have at least a predetermined minimum before right of way is transferred, and suitable caution signals will be provided to advise when the right of way indication for either highway is to be transferred to the other if one highway is indicating "proceed" in one or both of its parallel lanes.

In each of the forms of the invention, suitable recalling means are provided to take care of conditions where vehicles are trapped between the detectors and the intersection.

As will be appreciated, by employing a full automatic control system with independent speed control for one highway or for both highways if necessary, there is no possibility of a driver lawfully approaching and negotiating an intersection at a rate of speed greater than a rate which experience has indicated to be safe, and where the system is installed on a curve or other hazardous location, an equally satisfactory improvement in the safety factor will be provided.

In the accompanying drawings, I have, for purposes of illustration, shown the invention as consisting of a system having the independent speed control signal means located in the respective lanes of a more heavily travelled highway with associated detector operated signal means positioned in the respective lanes of the other or intersecting highway. It is to be understood that the various forms of the invention above recited may be employed in lieu of that shown, and these systems are readily constructed by simple modification of the wiring hook-up to be hereinafter described.

In the drawings:

Figure 1 shows the signal system with the indications to the respective highways indicating "stop" and a north bound vehicle just after it has actuated the detector in the main or north-south highway, it being understood that if the vehicle travels at a speed not greater than that prescribed for the location, it will obtain the green light by the time the intersection is reached, while the indications for the other or south bound lane of the main highway, as well as the lanes of the intersecting east-west highway will continue to display "stop".

Figure 2 is a view similar to Figure 1 in which the vehicle having travelled within the prescribed speed, has obtained the "go" indication.

Figure 3 is a view showing two vehicles in the main highway, the one going north having actuated the detector prior to the vehicle going south and both having independently obtained the green indication, and the "green" or "proceed" light in each case remains illuminated for a time period, sufficient to allow a vehicle after actuating a detector to travel within the prescribed speed and negotiate the intersection. Under the circumstances, the "proceed" signal for the north lane of the main highway in Figure 3 will change the normal "red" before the green signal for the south lane changes to normal "red".

Figure 4 is a view showing a vehicle just after having actuated the detector in the east lane of the intersecting highway, with each of the signals for the main highway locked to indicate normal "red" and with both signals for the lanes of the intersecting highway indicating "proceed" or "green", and Figure 5 is a diagrammatic illustration of a wiring hook-up for one form of the invention in which the independent speed control means are located in the most travelled highway, and detector operated means for transferring right of way are located in the intersecting highway.

Referring to Figure 5, the system embodies vehicle actuated means or detectors positioned in the intersecting highways and respectively designated NBD and SBD for north bound and for south bound traffic and EBD and WBD for east bound and for west bound traffic. For purposes of convenience, the north-south, NS, highway will be considered as the main or more travelled highway, and the east-west, EW, highway as the intersecting highway.

The traffic signals may be of any desired character and arrangement, and I have shown at each corner of the intersection, signals of a standard type designated respectively N, S, E, and W, each including a red, amber and green light. In this connection the detectors may be of any conventional design, as illustrated in Bulletin 351 of Automatic Signal Corporation, New York and Chicago on the page entitled "Electromatic pressure sensitive vehicle detector, non-directional type HR." but preferably are in accordance with my United States Patents Nos. 1,919,874 and 2,015,612.

Referring to Figures 1 and 5, all of the "stop" or "red" indications R for the respective highways are illuminated and this is the normal condition of the signal system. Assuming that a vehicle traveling north, as shown in Figure 1, has just actuated the detector NBD, and that the driver is traveling at a rate of speed not greater than the prescribed rate, the signal N will, after a predetermined time, be changed to "green" as shown in Figure 2. This result is accomplished because an impulse or call sent in to the north bound speed control timer NT through the line 10, after a prescribed delay, causes armature 11 to make contact with wire 12 energizing relay NR. This causes armature 13 to pick up, breaking contact with wire 47 leading to wire 20 and north red lamp RN and make contact with north green lamp GN through wire 46. This actuation is entirely independent of the other signals so that the lamp GN only is illuminated. The light GN, if there are no succeeding cars, will remain illuminated for a predetermined period sufficient to allow the car to negotiate the intersection, this control being adjustable by the timer NT for a particular location. At the end of this interval the relay NR becomes deenergized by armature 11 of the speed control north bound timer NT and normal indications again prevail the signal changing directly from "green" to normal "red". If cars are approaching in close proximity, i. e., each car actuates the detector while the signal is showing "green", the relay NR remains energized by the speed control north bound timer NT and its armature 11, until a gap occurs in the line of vehicles when the signal, a predetermined time after the last actuation of the detector, directly returns to normal "red".

The same actuation takes place if a car is approaching in a south bound direction on the north-south highway in that the detector SBD is actuated and sends in a call to the south bound speed timer ST, and through its armature 14 and associated contact and wire 15, energizes relay SR, the armature 16 of which breaks contact with wire 49 leading to red lamp RS and makes contact with wire 48 leading to lamp GS.

As shown in Figure 3, when both of the detectors NBD and SBD in the main highway are simultaneously or successively actuated, a similar independent operation of the signals occurs as described above.

When either detector EBD or WBD or both of them are actuated by traffic in the crossroad EW, a call is sent in to the right of way controller and timer CT which causes both red lamps ER and WR on signals governing traffic for road EW to become deenergized by armature 17 of timer CT breaking connection with contact 18. Armature 17 makes contact with wires 20 and 21 energizing simultaneously both red lamps RN and RS governing north and south bound traffic. At the same time, armature 19 makes contact with wires 12 and 15 thereby simultaneously energizing relays NR and SR. Armature 24 of relay NR makes contact with wire 26 energizing green lamps EG and WG which are connected in parallel, and this gives the "proceed" indication to east and west traffic while the indications in the main highway are locked at stop.

After a predetermined period of time, right of way controller and timer CT returns its armatures 17 and 19 to their normal positions and the signals revert to normal "red" after first sending in a call to both south bound and north bound speed timers ST and NT to clear any traffic that may be located on the main road between the detectors and the intersection. This is accomplished through contact EWA, call relay L and contacts 30 and 31.

In the operation of the signal as long as vehicles are moving only in the main highway, the speed control operates to change directly the lamps from green to red and red to green as described, there always being ample time for the driver to observe a change in the signal. That is, closely following cars will continue the green indication displayed indefinitely as above described. However, should there be a gap in the line of cars in either lane of the main or north-south highway, which gap is of a length greater than the distance from the detector to the far side of the intersection, of course, the green signal will revert to normal red. This is important in that the succeeding driver will have an opportunity to see the red signal in ample time to bring his car to a stop. Should he actuate the detector and drive up to the intersection, this act will either cause the speed control to operate as described, or if the signal has been changed to give right of way to the intersecting highway, the presence of the motorist between the detector and the intersection on the main highway will be recalled and the signal will revert to green at the end of the predetermined time period allowed for "go" or "proceed" on the intersecting highway.

As will be appreciated, when all of the indications for the respective highways are showing "stop", and either or both of the detectors EBD and WBD are actuated, depending on the relation of the timer, the right of way will be transferred to the east-west highway, while the signals for the north-south highway will be locked to show "stop" indications.

Also, when traffic is on the crossroad and right of way is to be taken from the main road, this might occur without respect to the distance of cars on the main road from the signal at the intersection. Consequently, it is of vital importance that the amber indication NA or SA be displayed on the main road if the green indication is being displayed prior to transfer of right of way to warn drivers of the impending change. This display of the amber indication is for a short predetermined time sufficient to allow traffic between the detector and the intersection to clear the intersection, and is accomplished by arm NSA controlled by right of way controller and timer CT just prior to transfer of right of way from road NS to road EW, making contact through contact 40 with wire 41 joining in parallel the heels of armature 42 of relay NR and armature 43 of relay SR.

Thus, if the signals are showing "red", arm NSA is actuated just prior to transfer of right of way to highway EW, relays NR and SR are deenergized, and contacts 44 and 45 being open, no amber lights are displayed. When either relay NR or SR is energized and either green light NG or SG or both are illuminated through wires 46 and 48, amber light NA will be illuminated through wire 50 and contact 44 if green light NG is illuminated, and if green light SG is illuminated, amber light SA will be illuminated through wire 51 and contact 45. When the green lights EG and WG on road EW are illuminated, just prior to transfer of right of way, contact EWA operated by timer CT makes contact with wire 52 for illuminating amber lamps EA and WA simultaneously.

Where the speed control detectors in the main or most travelled highway are to exert the dual function of also transferring right of way, the hook-up illustrated will be modified so that the detectors will be associated with the signal system through suitable timing means. Where all of the detectors exert the dual function of speed control and transfer of right of way, they will likewise be associated with suitable timing means. As will be appreciated, the electrical hook-up may be readily modified to make provision for these other forms of the invention.

The various timers referred to herein are of conventional design and readily commercially obtainable from such sources as Automatic Signal Corporation, Norwalk, Connecticut, or Chicago, Illinois, and described in the bulletins of this company, #38-3, Model 804-D and #352, Model 503-B with modifications for the particular signal installation, and are also illustrated and described in "Electronics", September, 1931, Page 95, et seq.

I claim:

1. A patrol system for intersecting highways having vehicle actuated detectors disposed in the opposed parallel lanes of each highway, visible signals for said highways each normally indicating "stop" and operated by said detectors to actuate the signals and give right of way between the intersecting highways, and means for rendering the signals for the opposed parallel lanes of a highway operable independently of each other to give the "proceed" signal to a vehicle moving toward the intersection in the lane in which the detector is situated.

2. A patrol system for intersecting highways having vehicle actuated detectors disposed in the opposed parallel lanes of each highway, visible signals for said highways each normally indicating "stop" and operated by said detectors to actuate the signals and give right of way between the intersecting highways, means for rendering the signals for the opposed parallel lanes of a highway operable independently of each other to give the "proceed" signal to a vehicle moving toward the intersection in the lane in which the detector is situated, and means for causing the "proceed" indication for said last-named highway to be given a predetermined time after actuation of a detector so that a vehicle must travel at a prescribed safe rate of speed after operating the detector in order to negotiate the intersection without having to stop and await the "proceed" indication.

3. A patrol system for intersecting highways having vehicle actuated detectors disposed in the opposed parallel lanes of each highway, visible signals for said highways each normally indicating "stop" and operated by said detectors to actuate the signals and give right of way between the intersecting highways, means for rendering the signals for the opposed parallel lanes of a highway operable independently of each other to give the "proceed" signal to a vehicle moving toward the intersection in the lane in which the detector is situated, means for causing the "proceed" indication for said last-named highway to be given a predetermined time after actuation of a detector so that a vehicle must travel at a prescribed safe rate of speed after operating the detector in order to negotiate the intersection without having to stop and await the "proceed" indication, and means for causing the "proceed" indication to remain for a predetermined time and then return to normal "stop".

4. A patrol system for intersecting highways having vehicle actuated detectors disposed in the opposed parallel lanes of each highway, visible signals for said highways each normally indicating "stop" and operated by said detectors to actuate said signals and give right of way between the intersecting highways, means for rendering the signals for the opposed parallel lanes of a highway operable independently of each other to give the "proceed" signal to a vehicle moving toward the intersection in the lane in which the detector is situated, means for causing the "proceed" indication for said last-named highway to be given a predetermined time after actuation of a detector so that a vehicle must travel at a prescribed safe rate of speed after operating the detector in order to negotiate the intersection without having to stop and await the "proceed" indication, means for causing the "proceed" indication to remain for a predetermined time and then return to normal "stop", and means for causing a succession of vehicles so closely located on a lane as to actuate a detector in that lane while the "proceed" signal is presented thereto to continue the "proceed" signal unless a detector in the other highway is actuated to transfer right of way.

5. A patrol system for intersecting highways having vehicle actuated detectors disposed in the opposed parallel lanes of each highway, visible signals for said highways each normally indicating "stop" and operated by said detectors to actuate said signals and give right of way between the intersecting highways, means for rendering the signals for the opposed parallel lanes of a highway operable independently of each other to give the "proceed" signal to a vehicle moving toward the intersection in the lane in which the detector is situated, and means for causing the "proceed" signal in the said last-named highway to indicate "caution" before returning to "stop" upon actuation of a detector in an intersecting highway for transferring right of way.

6. A patrol system for intersecting highways having vehicle actuated detectors disposed in the opposed parallel lanes of each highway, visible signals for said highways each normally indicating "stop" and operated by said detectors to actuate said signals and give right of way between the intersecting highways, means for rendering the signals for the opposed parallel lanes of a highway operable independently of each other to give the "proceed" signal to a vehicle moving toward the intersection in the lane in which the detector is situated, and means for causing the "proceed" signal to be given to the intersecting highway upon actuation of a detector therein after a predetermined minimum time and for maintaining the "proceed" signal in the intersecting highway for a predetermined minimum time before it returns to "stop".

7. A patrol system for intersecting highways having vehicle actuated detectors disposed in the opposed parallel lanes of each highway, visible signals for said highways each normally indicating "stop" and operated by said detectors to actuate said signals and give right of way between the intersecting highways, means for rendering the signals for the opposed parallel lanes of a highway operable independently of each other to give the "proceed" signal to a vehicle moving toward the intersection in the lane in which the detector is situated, and means for causing the "proceed" signal to be given to the intersecting highway upon actuation of a detector therein after a predetermined minimum time and for maintaining the "proceed" signal in such intersecting highway for a predetermined minimum time before it returns to "stop", said last-named means being independent of the actuation of either detector in the first highway.

8. A patrol system for intersecting highways having vehicle actuated detectors disposed in the opposite parallel lanes of each highway, visible signals for said highways each normally indicating "stop" and operated by said detectors to actuate said signals and give right of way between the intersecting highways, and means for rendering the signals for the opposed parallel lanes of each highway operable independently of each other to give the "proceed" signal to a vehicle moving toward the intersection in the lane of a highway in which the detector is situated.

9. A patrol system for intersecting highways having vehicle actuated detectors disposed in the opposite parallel lanes of each highway, visible signals for said highways each normally indicating "stop" and operated by said detectors to actuate said signals and give right of way between the intersecting highways, means for rendering the signals for the opposed parallel lanes of each highway independently operable of each other to give the "proceed" signal to a vehicle moving toward the intersection in the lane of a highway in which the detector is situated, and means for causing the "proceed" signal to be given to the other highway upon actuation of a detector therein after a predetermined minimum time and for maintaining the "proceed" signal in such other highway for a predetermined minimum time before it returns to "stop".

10. A patrol system for intersecting highways having vehicle actuated detectors disposed in the opposite parallel lanes of each highway, visible signals for said highways each normally indicating "stop" and operated by said detectors to actuate said signals and give right of way between the intersecting highways, means for rendering the signals for the opposed parallel lanes of each highway operable independently of each other to give the "proceed" signal to a vehicle moving toward the intersection in the lane of a highway in which the detector is situated, and means for causing the "proceed" signal in any highway to indicate "caution" before returning to "stop" upon actuation of a detector in the intersecting highway for transferring right of way.

11. A patrol system for intersecting highways having vehicle actuated detectors disposed in the opposed parallel lanes of each highway, visible signals for said highways and operated by said detectors to actuate the signals and transfer right of way between the intersecting highways, the signals in one of said highways normally indicating "stop", and means for rendering the signals for the opposed parallel lanes of said last named highway operable independently of each other to give the "proceed" signal to a vehicle moving toward the intersection in the lane in which the detector is situated.

12. A patrol system for intersecting highways having vehicle actuated detectors, visible signals for said intersecting highways operated by said detectors and the signal in one of said highways normally indicating "stop", speed control means in said last named highway for causing the "proceed" indication to be given a predetermined time after actuation of a detector in that highway so that a vehicle must travel at a certain prescribed rate of speed after operating the detector in order properly to negotiate the intersection, means actuated by a detector in a highway intersecting the first named highway for giving the "proceed" indication to the second mentioned highway and maintaining the signal in the first named highway at "stop" as long as the "proceed" signal is being given to said last named intersecting highway, and means for making the signal in the first highway again operable so that upon actuation of this last named means and actuation of the detector in the first named highway, such actuation of the detector in the first named highway will cause said speed control means to give the "proceed" indication a prescribed time after actuation of the detector in the first highway.

CHARLES ADLER, Jr.